Patented Nov. 13, 1923.

1,473,901

UNITED STATES PATENT OFFICE.

DOMENICO CARBONE, OF MILAN, ITALY.

PROCESS FOR THE PREPARATION OF A PRODUCT FOR THE MACERATION OF VEGETABLE SUBSTANCES AND THE RESULTING PRODUCT.

No Drawing.     Application filed October 24, 1922.   Serial No. 596,628.

*To all whom it may concern:*

Be it known that I, DOMENICO CARBONE, residing at 14 Via A. Lecchi, Milan, in the Kingdom of Italy, have invented a new and useful Process for the Preparation of a Product for the Maceration of Vegetable Substances and the Resulting Product, for which I have filed application in Italy July 31, 1922, and of which the following is a specification.

The process herewith described deals with the preparation of a macerated product suitable for the treatment of vegetable substances for industrial scopes as, for ex., the maceration of textile fibres, and also the product itself. The process consists in cutting into pieces raw potatoes, with or without the peel, placing them in water and adding felsinozima, i. e., a culture of bacillus felsineus, or any other preparation containing macerating microbes.

The whole should be maintained at a proper temperature until a more or less complete decomposition of the potatoes has taken place.

The product is thus obtained ready to be poured into the tanks for the maceration of vegetable substances.

Having now described my invention and how the same is to be carried out, what I claim as my invention is:

1. Process for the preparation of a product for the maceration of vegetable substances, by placing raw potatoes in water with the addition such as of any preparation containing macerating microbes, leaving same standing until the more or less complete decomposition of the potatoes has been reached.

2. A macerating product for vegetable substances, obtained by the process described under claim 1.

In testimony whereof I affix my signature.

DOMENICO CARBONE.